US010628759B2

(12) United States Patent
Scicluna et al.

(10) Patent No.: US 10,628,759 B2
(45) Date of Patent: Apr. 21, 2020

(54) SYSTEMS AND METHODS FOR MANAGING NETWORKED VEHICLE RESOURCES

(71) Applicant: ADDISON LEE LIMITED, London (GB)

(72) Inventors: Larry Scicluna, London (GB); Andrey Glaschenko, Samara (RU)

(73) Assignee: ADDISON LEE LIMITED, London (GB)

(*) Notice: Subject to any disclaimer, the term of this patent is extended or adjusted under 35 U.S.C. 154(b) by 488 days.

(21) Appl. No.: 15/051,909

(22) Filed: Feb. 24, 2016

(65) Prior Publication Data
US 2016/0247096 A1 Aug. 25, 2016

(30) Foreign Application Priority Data

Feb. 24, 2015 (GB) ..................... 1503080

(51) Int. Cl.
*G06Q 10/02* (2012.01)
*G06Q 50/30* (2012.01)

(52) U.S. Cl.
CPC ............. *G06Q 10/02* (2013.01); *G06Q 50/30* (2013.01)

(58) Field of Classification Search
CPC ................ G06Q 10/02; G06Q 50/30
See application file for complete search history.

(56) References Cited

U.S. PATENT DOCUMENTS

| 9,426,638 | B1* | 8/2016 | Johnson | H04W 4/90 |
| 2010/0250292 | A1 | 9/2010 | Wurster | |
| 2013/0066688 | A1* | 3/2013 | Pinkus | G06Q 10/06 705/7.41 |
| 2013/0321178 | A1 | 12/2013 | Jameel et al. | |

(Continued)

FOREIGN PATENT DOCUMENTS

| JP | 2006170814 A | 6/2006 |
| KR | 1020120132978 A | 12/2012 |
| KR | 1020130105464 A | 9/2013 |

OTHER PUBLICATIONS

Huang, Yan, et al. "Large Scale Real-Time Ridesharing with Service Guarantee on Road Networks." Proceedings of the VLDB Endowment, vol. 7, No. 14, Jan. 2014, retrieved on Dec. 3, 2018. pp. 2017-2028., doi:10.14778/2733085.2733106. (Year: 2014).*

(Continued)

*Primary Examiner* — Daniel Vetter
*Assistant Examiner* — Manal A. Alsamiri
(74) *Attorney, Agent, or Firm* — Potomac Law Group, PLLC; Mark A. Catan

(57) ABSTRACT

A method and apparatus for managing a networked vehicle resource sharing facility, the method and system provide for: defining a geographical area as a work region;
storing, in a data structure, data relating to vehicle hire bookings beginning inside the work region, wherein the booking information for each booking includes a default delay time;

(Continued)

applying a rule to determine that an additional delay condition or fully booked condition is satisfied within the work region; and in response to positively determining, automatically introducing an additional delay or a fully booked setting, respectively, to at least some of the vehicle hire bookings inside the work region.

20 Claims, 8 Drawing Sheets

(56) References Cited

U.S. PATENT DOCUMENTS

| | | | | |
|---|---|---|---|---|
| 2015/0233719 A1* | 8/2015 | Cudak | ................ | G01C 21/26 |
| | | | | 701/23 |
| 2015/0339923 A1* | 11/2015 | Konig | ................ | G08G 1/202 |
| | | | | 701/522 |

OTHER PUBLICATIONS

Huang, Yan, et al. "Large Scale Real-Time Ridesharing with Service Guarantee on Road Networks." Proceedings of the VLDB Endowment, vol. 7, No. 14, Jan. 2014, pp. 2017-2028., doi:10.14778/2733085.2733106. (Year: 2014).*

International Search Report and Written Opinion for PCT/IB2016/051007 dated Jul. 13, 2016.

* cited by examiner

SYSTEMS AND METHODS FOR MANAGING NETWORKED VEHICLE RESOURCES

FIELD

The present invention relates to systems for the management of networked vehicle resources.

BACKGROUND

In the field of private hire vehicle resources, historically vehicles and drivers were allocated to bookings by a human operator, called a controller. The controller would be in contact with the drivers of vehicles of a fleet by voice channels (typically one shared voice channel) of a radio system, through which the controller and the drivers could speak with one another. The controller could ascertain the locations of drivers by requesting the drivers to provide their locations verbally. The controller could also enquire of drivers when they expected to drop passengers and thus become free again for fulfilling a booking. Drivers would be provided with details of bookings allocated to them by the controller verbally through the radio system. Such manual systems are still widely in use.

Where a particular region becomes busy, for example during rush hour, it is often necessary to introduce delays to bookings to reflect the current conditions. The management of vehicle resources during busy periods has usually been performed manually by the controller as well. As allocation of vehicle resources becomes increasingly automated, an approach is needed that takes into account real-time road conditions during automatic allocation.

DETAILED DESCRIPTION

Overview

Figure 1A:
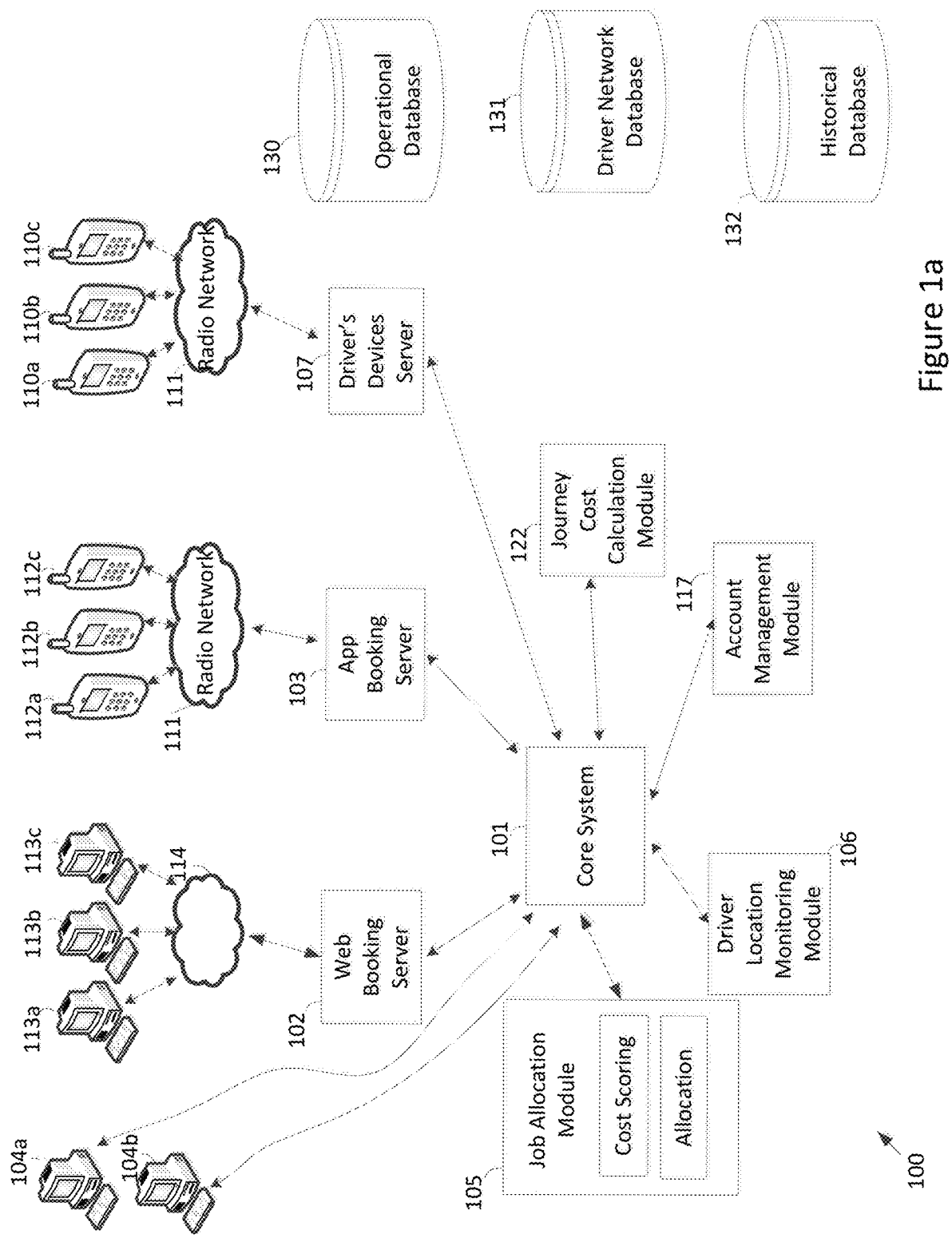
FIG. 1a is a schematic diagram of a system for management of a private hire vehicle service according to various aspects of the present invention.

Embodiments of the invention react automatically when a busy region is detected and increase delays in those busy regions where work volumes have increased to such an extent that response times have been affected due to a lack of available drivers in that region.

This functionality provides an improved service because the introduction of additional delays is dynamic. The determination of whether to introduce or to remove an additional delay is automatic. Moreover, the level of the additional delay may be dependent on the work volume within a particular area.

The system can respond immediately to any increased volume in work traffic and or variation in numbers across the circuit of available drivers, allowing clients to receive accurate and realistic response times. A steady flow of work may also be maintained. By managing the increased work volume efficiently, the frequency of applying a 'Fully Booked' (FB), i.e., no further work, setting to the fleet may be reduced.

By feeding the additional delays into the automatic allocation system, response times throughout a city, such as Greater London can be improved greatly. In systems where default delay times are used, it is possible to reduce these default delay times since it is possible to introduce additional delays automatically to handle spikes in work volume as and when necessary. As such, the addition of additional delays is beneficial, not only during busy periods, but also during quieter periods. Furthermore, delays for ASAP bookings (as opposed to pre-booked requests) may also be reduced.

In accordance with some embodiments, systems, methods, apparatus, and computer-readable media provide for:
 defining a geographical area as a work region;
 storing, in a data structure, data relating to vehicle hire bookings beginning inside the work region, wherein the booking information for each booking includes a default delay time;
 applying a rule to determine that an additional delay condition or fully booked condition is satisfied within the work region; and
 in response to positively determining, automatically introducing an additional delay or a fully booked setting, respectively, to at least some of the vehicle hire bookings inside the work region.

In accordance with some embodiments, systems, methods, apparatus, and computer-readable media may further provide for: comparing the number of unallocated bookings beginning inside the work region that are due for allocation to a stored busy threshold; and designating the work region as a busy region if the number of unallocated bookings exceeds the busy threshold.

In accordance with some embodiments, systems, methods, apparatus, and computer-readable media may further provide for: designating the busy work region as a hot spot region.

The busy threshold may be defined as a ratio of the number of currently active vehicles to a user inputted number.

Determining that an additional delay rule or fully booked rule is satisfied may comprise determining that a number of bookings having a ratio of a pickup countdown time to default delay time below a predetermined value exceeds a threshold for introducing an additional delay or a threshold for introducing a fully booked setting.

Determining that an additional delay rule or fully booked rule is satisfied may comprise determining that the number of unallocated bookings that are due for allocation exceeds a threshold for introducing an additional delay or a threshold for introducing a fully booked setting.

The threshold for introducing an additional delay or the threshold for introducing a fully booked setting may be a preset multiple of the busy threshold.

The additional delay for a booking may comprise a multiple of the default delay time for the booking.

The additional delay may comprise a predetermined time period, for instance to minutes.

In accordance with some embodiments, systems, methods, apparatus, and computer-readable media may further provide for: transmitting a message to a customer making a subsequent booking beginning inside the work region of the additional delay or fully booked status.

The magnitude of the additional delay applied to a booking may be dependent on the service group and/or booking type.

A fully booked setting may be applied exclusively to a booking having a priority setting below a priority threshold.

In accordance with some embodiments, systems, methods, apparatus, and computer-readable media may further provide for: removing any additional delay or fully booked setting after a predetermined offset time has elapsed.

Defining a geographical area as a work region may comprise forming a region group consisting of a plurality of geographical regions.

The fleet of vehicles may comprise one or more autonomous vehicles. FIG. 1a is a schematic diagram of a system for management of a private hire vehicle service according to various aspects of the present invention.

The system 100 includes a number of interconnected components, as will now be described. The system 100 includes at its centre a core system 101. This comprises one or more server computers running system software that ensures smooth operation of the system 100.

Key functions of the system 100 are bookings, allocation of a private hire vehicle to a booking, vehicle and driver management, account management and record keeping.

The booking function is provided primarily by a web booking server 102, an application booking server 103 and call centre terminals 104A and 104B, all of which are coupled to the core system 101.

The allocation function is provided primarily by a job allocation module 105, with information from other parts of the system 100.

The system includes database functions. In particular, an operational database 130 stores records that relate to general operation of the system 100. A driver network database 131 stores records that relate to drivers and vehicles that are managed by the system 100. Lastly, a historical database 132 stores records that have been archived from the operational database 130. Archiving of records from the operational database 130 to the historical database 132 occurs periodically and only records that are no longer needed for general operational use are archived.

The vehicle and driver management function is provided primarily by a driver location monitoring module 106 and a driver's devices server 107, with reference to the driver network database 131 as well as other components of the system 100.

The account management function is provided primarily by an account management module 117, utilising accounts information stored in the operational database 130 along with other components of the system 100.

The operational database 130 stores details of every account held with the operator of the system 100. Each account is identified by an account number stored in the operational database 130. The accounts information stored in the operational database 130 may include an account name, such as a company name and contact details for the company. The accounts information stored in the operational database 130 stores credit card details and/or other payment details so that payment can be taken from the account holder if permitted. A password and/or PIN (personal identification number) is associated with each account and stored with the accounts information in the operational database 130. Furthermore, a list of persons authorised to make bookings on the account may be stored, and optionally profiles for the individual authorised persons within the accounts.

The accounts information stored in the operational database 130 may also include a contact name and telephone number of a person who should be contacted in case of problems with the account. The accounts information stored in the operational database 130 includes information regarding invoicing preferences, for example the frequency of invoicing, date on which the invoice should be sent, the monthly/weekly credit limit and what information from each booking should be included on the invoice. The accounts information stored in the operational database 130 may indicate whether each account is active, or if it has been placed on hold. An account may be placed on hold by a credit control department and this may prevent further bookings being made on the account. Historical data of spending on the account may also be stored in the operational database 130, or this may be stored in the historical database 132.

The record keeping function is provided primarily by the historical database 132, although the operational database 130 and the driver network database 131 also provide some record keeping function.

In brief, a fleet of private hire vehicles is managed by the system 100. Each vehicle has a respective record in the driver network database 131, as will now be described.

The driver network database 131 stores information about every vehicle in the fleet. The registration number (license plate number) of each vehicle is stored in the driver network database 131. This may be used to identify each vehicle. Alternatively or in addition, a unique identifier separate from the registration number may be assigned to each vehicle as the primary means of identification within the driver network database 131.

Each Service is defined according to its vehicle type, capacity and other characteristics. In some embodiments, these types are "Up to 4 passengers", "Up to 7 passengers", "Electric vehicle", "VIP" and "Up to 4 passengers with luggage". The driver network database 131 stores the type of each vehicle and may also store a corresponding number or short string of characters which represents each type. Any special equipment such as a baby seat or the ability to accommodate a wheelchair is also identified in the driver network database 131. The driver network database 131 indicates the current driver to whom the car is assigned, although the driver/vehicle allocation changes from time to time.

The driver network database 131 stores the make and model and optionally the colour of each vehicle. The driver network database 131 also indicates the current status of the vehicle. In some embodiments, the status is chosen from "Driver Pool", meaning that the car is in use by a driver, "Free Pool", meaning that the car is not currently being used and is free to be allocated to a driver and "Workshop", meaning that the car is undergoing maintenance or repair. The driver network database 131 also stores the private hire license number (PCO) for each vehicle and the date on which this license expires as well as the road tax, vehicle insurance and MOT (vehicle roadworthiness certificate) expiry dates if appropriate. Examples of other data which may be stored are the date of purchase of the vehicle, the price paid for the vehicle, the date of manufacture, the supplier of the vehicle, warranty information and the date of the last inspection/maintenance.

Historic data about each vehicle may also be stored in the driver network database 131, such as a record of the previous registration numbers and a record of the previous drivers who were assigned to the vehicle. The service history and details of any accidents and repairs may also be stored.

The fleet of private hire vehicles is driven by a pool of drivers, each of which has a record in the driver network database 131.

The driver network database 131 stores information about each of the drivers registered with the operator of the system 100. The information relating to drivers includes personal data such as name, contact details (including phone number, home address), date of birth, next of kin and driver account data. Driver status information may be stored to indicate whether a driver is active or inactive, whether the driver has been allocated a vehicle etc. Each driver may also be assigned an individual and unique identifier as a means of identifying the driver. Callsigns may also be used to denote drivers and are stored in the driver network database 131, although callsigns can be changed and reallocated between drivers as long as the same callsign is not in use by two drivers at the same time.

Driver account data includes an account number. Other information may include a driver's insurance details, a driver's length of service in the fleet, details of parking fines, historical wage information, holiday leave, driver diary information, information regarding payment collections from drivers, driver's licence number, national insurance (social security) number, details relating to a driver's taxicab licence (such as Public Carriage Office (PCO) licence), driver banking details (account number, sort code etc.). Miscellaneous information such as details of any allergies, smoker/non-smoker etc. may also be stored in the driver network database 131. Information regarding driver equipment such as a serial number of the driver's device 110 allocated to the driver, and mobile phone number of their driver's device 110 and their private mobile phone may also be recorded. Statistical information such as date of last job or historical earnings data may be recorded in the driver network database 131, or this may be recorded in the historical database 132.

Information relating to payments to and from drivers may be stored in the driver network database 131. Payments to the driver include a driver's wages. Driver outgoings may include, for example, car wash charges, insurance premiums, PCO renewal fee, accident costs, vehicle rental. To assist in maintaining this information, a purchase ledger number and contract number relating to each driver may be stored.

Each driver has an associated driver's device 110, three of which are shown at 110A, 110B and 110C in the Figure. The driver's devices 110 are portable electronic devices that are provided with wireless communication facilities. The driver's devices 110 may take any suitable form, but typically are smart phones or personal digital assistants or such like. The driver's devices 110 include a display and one or more input devices such as a keyboard, a voice control module or a touch screen or any combination thereof.

The driver's devices 110 are connected to the driver's devices server 107 via radio network 111, which may for instance be a mobile phone (cellular phone) network. In this case, the driver's devices 110 are provided with subscriptions to the mobile phone network such that they can send digital data to and from the driver's devices server 107. Additionally, messages are able to be passed between the driver's devices 110 and the driver's devices server 107 through other media, and in particular SMS (short message service) messages and optionally also MMS (multimedia message service) messages.

The radio network 111 may alternatively be a dedicated radio network, for instance a private mobile phone network or a private radio network of some other type.

Data may be communicated between the driver's devices 110 and driver's devices server 107 over any suitable communications link, for instance using a data channel of a cellular telephone network such as a GSM, EDGE, GPRS, UMTS, HSxPA or LTE network.

The driver's devices 110 are configured to report their locations to the driver network database 131 at regular intervals, for instance 30 second intervals. The driver's devices 110 include GPS (global positioning system) receivers, which calculate the locations of the driver's devices 110 under control of the software applications executing on the driver's devices 110. Alternatively, they may include some other positioning module or device that is operable to calculate the positions of the driver's devices 110 with a suitable level of accuracy and resolution.

A private hire vehicle may be booked by a customer in one of three ways. Firstly, a private hire vehicle may be booked in a telephone conversation with a call centre operator. In this case, the customer initiates a telephone call with a call centre, an agent of which operates one of the call centre computer terminals 104A and 104B. The call centre agent then operates the terminal 104A, 104B so as to make the booking of the private hire vehicle according to the customer's requirements. The customer's requirements are obtained verbally during the telephone conversation between the customer and the agent.

In the second option, the customer may make the private hire vehicle booking using a browser application on a computing device 113, three examples of which are shown at 113A, 113B and 113C in the Figure. Each of the computing devices 113 is connected to the web booking server 102 by a network 114, which may for instance be the Internet or another public or private network. The web booking server 102 includes web server functionality that causes display of suitable web pages by the browser of the terminal 113. The customer's requirements with respect to the private hire vehicle booking are obtained by the web booking server 102 through the provision of suitable pages to the computer terminal 113 requesting the provision of the required information by the customer. The information may be provided by the customer through free text entry through the use of drop down lists, radio buttons etc. Some information may be pre-filled into the web pages provided by the web booking server 102.

Booking through the web booking server 102 may require the customer to login to a web portal before they can make their booking. The logging in may require the entering of a username and a password or PIN number. Through the control of a web session by the web booking server 102, for instance using cookies provided to the computer terminals 113, the booking can be known to have been validly made by virtue of the customer having being logged in to the web booking server at the time the booking was made.

The final way in which a customer can make a booking of a private hire vehicle is using a dedicated software application that is installed on and running on a portable communications device 112, three of which are shown at 112A, 112B and 112C in FIG. 1*a*. The portable communications devices 112 may take any suitable form, but typically are smart phones, feature phones, tablet computers or personal digital assistants or such like. The communication devices 112 are coupled to the application booking server 103 by a radio network 111, which may be the same as the radio network 111 described above with relation to the driver's devices 110 and the driver's devices 107.

The application is configured to provide a user interface that allows the customer to provide the software application with the information required to make the private hire vehicle booking. For instance, the software application, when executed, may cause the display of interactive pages that allow the customer to select or enter the required information. The software application is configured also to communicate the information relating to the booking that has been provided by the customer to the application booking server 103. If based on information provided by the customer it is determined that the application booking server 103 requires additional information, the software application running the mobile device 112 is configured to provide an interactive display to the customer such that the customer can provide the information, following which the software application causes it to be provided to the application booking server 103.

The customer may be required to log in to the software application on the mobile device 112, prior to making a booking. Logging in to the software application may require a username and a password or PIN number. Alternatively, the username may be entered during set up of the application and may not need to be entered subsequently when this software application is executed. If the username is not required to be entered, the user may log in to the software application simply by entering the password or PIN number.

The information about the private hire vehicle booking that is obtained during the booking process is as follows.

Customer details. The customer details may be the name of the customer or an identifier that uniquely identifies the customer within the operational database 130.

Service type. This indicates the category of vehicle. For instance, the service type may indicate a vehicle of a standard type and having four seats, or a vehicle of a standard type and having seven seats. The service may alternatively indicate a VIP vehicle, or an environmentally-friendly (electric or hybrid) vehicle (also known as a green vehicle).

Journey type. The journey type may be a single (one-way) trip, or it may be a wait and return trip. The journey type may alternatively be a journey including multiple pick-up locations or multiple drop off locations or both multiple pick-ups and multiple drop off locations. The journey type may alternatively indicate that it is a pick-up from an airport or a drop at an airport.

Pick-up address. This indicates an address at which the customer is to be picked up at the beginning of the journey. The address is a natural language address. The address is selected from one of the plurality of addresses stored in a database. The addresses may be stored in the operational database 130 or the historical database 132, or they may be provided by an external address database service, for instance geo.me or qas.co.uk. The addresses each have associated therewith a verified coordinate location expressed in latitude and longitude. Multiple databases may be used (in a hierarchical fashion) for address lookup. The pick-up address may be selected by the customer in any suitable way, with the most appropriate way depending on whether the customer is using the software application on their mobile device, using the web booking service or using an agent in a call centre. If the journey type is an airport pick-up type, the pick-up address indicates the airport and terminal and optionally flight number.

Drop off address. The drop off address again is selected from one of multiple addresses stored in the database and is selected by the customer in any suitable way. If the journey type is an airport drop off type, the pick-up address indicates the airport and terminal and optionally flight number.

Pick-up date and time. This indicates a time and date which the customer requires the journey to start. Alternatively, the date and time may indicate ASAP (as soon as possible), if the customer requires the private hire vehicle at the earliest opportunity.

Optional information regarding the booking includes the following.

Customer's reference. This can be provided for instance as free text or selected from a drop-down menu. If a reference is provided, this information can be included in an account statement against a journey at a later date.

Additional comments. This is free text that provides any potentially relevant information, and may be provided to the driver once the booking has been allocated.

The system 100 comprises a journey cost calculation module 122. The cost calculation module 122 executes software code which determines the price for a requested journey, during the booking process and prior to vehicle allocation. Journey cost calculation is performed at the time of a booking and the result returned to the customer requesting the booking. The resulting cost for the journey is provided before the customer confirms the booking.

The journey cost calculation module 122 uses a number of different ways of calculating the base cost of the journey. The module 122 may set a fixed price for some journeys. These are agreed in advance with a particular account customer for journeys between pre-determined points. The cost calculation module 122 checks whether the booked journey and customer meet the requirements for a fixed price tariff. If the conditions are not met, then another pricing method is used. The cost calculation module 122 may use zonal pricing if a fixed price is not used. Where every point on the journey is within a defined zone, zonal pricing can be used. If neither fixed pricing nor zonal pricing is used, or if the conditions for their application are not met, then the cost calculation module 122 may use an A to B (A-B) pricing method. The A-B method may specify the number of units between points A and B. A unit price depending on the type of vehicle etc. is then used to calculate the price. If there is no A-B record for a particular journey, the crow fly (direct) distance (i.e., the length of a straight line between the pick-up and drop-off locations) is used to calculate the base cost for the journey. This method may use map grid references or alternatively may be based on GPS data, i.e. the latitude and longitude of the pick-up and drop-off points.

The cost calculation module 122 may retrieve all the map and location information needed to make these calculations from the historical database 132. The historical database 132 may store a detailed geospatial model of a particular region, such as a city. As an alternative, or in addition to the methods described above, the cost calculation module 122 may use the real road distance for the journey, which is calculated using the road map from the historical database 132 and a route planning algorithm. Different rates may be used for different parts of a single journey. For example, a first per mile rate may be used for the first 10 miles of a journey and a second per mile rate may be used for the rest of the journey. The historical database 132 may also store information regarding speed limits and historical traffic data. This information may also be used by the cost calculation module 122 to calculate an estimated time for the journey. The estimated journey time may then form the basis of the cost calculation.

Other criteria used by the cost calculation module 122 when calculating the price are the type of vehicle (VIP, green, 7-seater etc.) including any special facilities the vehicle has, the method of payment and the date and time of the journey. The cost calculation module 122 may also apply a flat "pick-up fee" for every journey.

The cost calculation module 122 may also determine how much of the fare charged to the customer is passed to the driver. This may be a simple percentage of the total fare or a more complex calculation based on one or more of journey time, distance, waiting time and number of passengers.

The allocation function allocates a vehicle and driver to a booking. The allocation function is described in some detail below. In brief, a vehicle and driver are allocated to the booking, and the associated customer, having regard to a number of factors including the pick-up location specified in the booking, the drop off location specified in the booking, the service type specified in the booking, the date and time specified in the booking, the geographical distribution of the vehicles that are managed by the system 100, the demand for vehicles that are managed by the system 100 and information relating to the drivers.

The allocation function is automatic insofar as it does not require any manual involvement once the booking has been made. Once a job has been allocated to a particular driver and a particular vehicle, this is recorded in the operational database 130 with an indication that the journey has not yet been travelled.

The vehicle and driver management function includes a number of features. These include the monitoring of vehicle in terms of distance travelled etc. and ensuring that they provided for mechanical servicing at appropriate times. Drivers are managed also to ensure that documentation relating to private hire vehicle licenses, insurance etc. is in place. Additionally, the function maintains a record of hours worked and jobs performed, along with any other relevant information.

The accounts management function acts to manage information relating to customer's accounts with the operator of the system 100. This includes the maintenance and management of information such as authorised users, credit limits, invoicing requirement etc.

The record keeping function acts to store various information that is created by or observed by the system 100. This information includes information about bookings yet to be fulfilled, which is included in the operational database 130.

Figure 2:
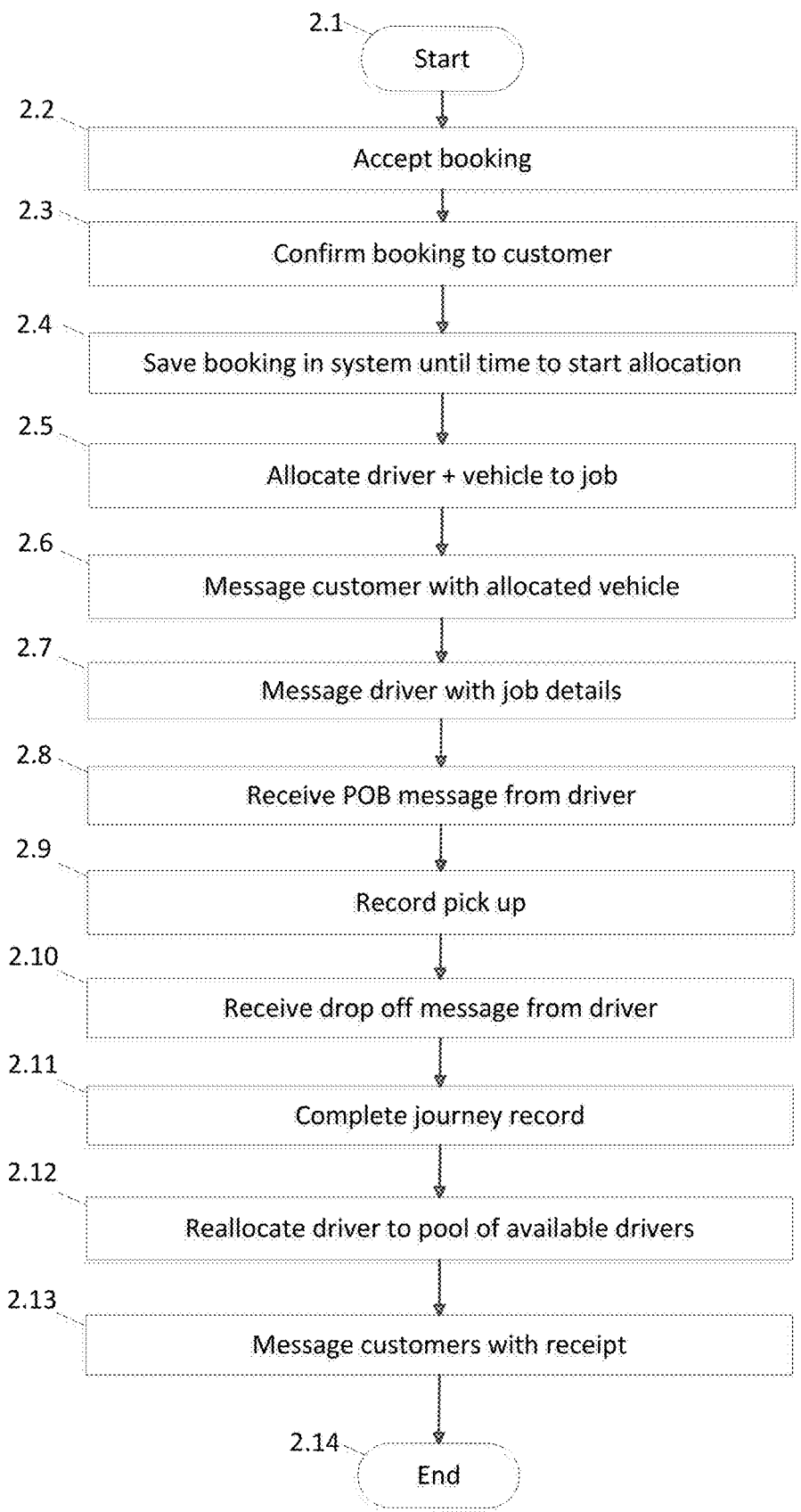
FIG. 2 is a flow chart illustrating overall operation of the system in fulfilling a booking through providing a private hire vehicle, and is performed by the system of FIG. 1a or the system of FIG. 1b.

The sequence of steps that are performed by the system during execution of a job will now be described with reference to FIG. 2. This shows execution of a relatively simple job in which there is one pick-up location, one drop-off location, no driver reallocation and no variation in the journey. Additionally, journey costing and invoicing are not covered by this Figure.

The operation starts at step 2.1. At step 2.2, a booking is accepted by the system 100. Alternative ways for accepting a booking are described above with reference to FIG. 1a.

At step 2.3, the booking is confirmed to the customer, for instance by email. The message sent to the customer by the system 100 includes a booking reference number and some or all of the information relating to the booking, including the pick-up and drop off locations, the date and time of pick-up etc.

At step 2.4, the system 100 saves the booking until it is time to start allocation. For an ASAP job, allocation may commence straight away. Otherwise, allocation may start a fixed time before the date and time specified for pick-up in the booking information, as is described in more detail below.

At step 2.5, the system allocates a driver and a vehicle to the job. This is discussed in relation to FIG. 3 and FIG. 4 below. On allocating the vehicle, the status of the vehicle and driver is changed from "Available" to "Allocated". This prevents the vehicle/driver being allocated to a different job until the status changes to a suitable status.

At step 2.6, the system 100 sends a message to the customer with details of the allocated vehicle. The message includes text such as 'Your vehicle is on its way'. The message also indicates the job number, which may be the same as the booking number. The message also indicates the identity of the vehicle, so that it can be readily identified by the customer. The identity of the vehicle may be indicated for instance by the registration or licence plate that is provided on the vehicle. It may also indicate the make and model of the vehicle, and/or the colour of the vehicle. Additionally, the message includes information by which the customer can contact the driver that has been allocated to the job. For instance, it may include the mobile telephone number of the driver. Providing the mobile telephone number of the driver allows the customer to call the driver with any comments or questions that they may have before the customer is collected by the vehicle. Additionally, the message includes a hyperlink to a webpage at which the location of the vehicle is shown on a map. This allows the customer to identify where the vehicle is at any stage between the vehicle being allocated to the job and the customer being collected by the vehicle.

At step 2.7, the system 100 sends a message to the driver with details of the job. The message includes various pieces of information including the name of the customer. This allows the driver to confirm the customer when the driver meets the customer at the pick-up location. The message also includes the pick-up location and the drop off location. The pick-up location and drop off location may be provided in the message in such a way that they can be extracted by the driver's device 110 and automatically placed into a navigation application that is present on the driver's device 110. This allows the driver to commence the provision by the driver's device 110 of navigation guidance to the pick-up location in response to the driver selecting the pick-up location by way of an input on the driver's device 110. Similarly, after the customer has been collected at the pick-up location, the driver can cause the device 110 to commence providing route guidance to the drop off location by providing a suitable input on the driver's device 110.

The system may comprise a route planning module configured to run a route planning algorithm. The route planning module may access the map and location database 109 in order to calculate a route. The route planning module may also access historical traffic data in the historical database 132 and/or live traffic information in order to more accurately predict the fastest route. Once a driver has indicated that they have picked up a customer, the route planning module may provide route guidance to the driver via the driver's device 110. The route guidance may be in the form of navigation instructions. Having a centralised route planning and guidance providing system avoids the need for the driver to provide their own route guidance device and to keep such a device updated.

At step 2.8, the system 100 receives a POB (passenger on board) message from the driver. This message is transmitted by the driver's device 110 in response to the driver indicating that they have collected the customer from the pick-up location. The option to indicate POB status is provided to the driver once the driver device 110 determines that the vehicle has arrived at the pick-up location, or is within a predetermined radius (e.g., 50 m) of the pick-up location and has become stationary. However, the sending of the POB message from the driver's device 110 is not automatic. In this step, the status of the vehicle/driver is changed from "Allocated" to "POB".

Following receiving the POB message from the driver, the system 100 at step 2.9 records that the customer has been picked up. Next, the system 100 receives a drop off message from the driver at step 2.10. This is message is sent by the device 110 after the driver indicates to the driver's device 110 that the customer has been deposited at the drop off location. The option to indicate that the customer has been dropped off may be provided to the driver upon the driver's device 110 determining that the vehicle has reached the drop off location or is within a predetermined radius (e.g., 50 m) of the drop off location and has become stationary. However, the sending of the drop off message from the driver's device 110 is not automatic.

After the drop off message has been received from the driver's device 110 at step 2.11, the system 100 completes a journey record for the journey in the operational database 130 (the record was created during the booking process). The record of the journey stored in the operational database 130 includes the following information. The record includes the pick-up address and the drop off address. The information also includes the pick-up time and date and, if different, the booking time and date. The record also includes the drop off time and date, as detected by the system 100 in response to receiving the drop off message from the driver at step 2.10. The record also includes the cost of the journey, in terms of financial value.

The record also includes the travelled distance, which is not the crow fly (direct) distance between the pick-up and drop off locations but instead is the road distance travelled by the vehicle. The record also includes the journey time, in terms of minutes and seconds. The record also includes vehicle type information that indicates the type of vehicle that performs the journey.

The record also includes the booking information relating to the journey, which may include information about the identity of the customer that made the booking, the time of making the booking, the mode of making the booking (e.g., web, application or call centre) and any other relevant information relating to the booking.

Next, at step 2.12 the driver and vehicle are reallocated to the pool of available drivers. This is achieved by changing the status of the vehicle/driver to "Available" from "POB".

The customer is then messaged with a receipt for the journey travelled, if required, at step 2.13. Lastly, the operation ends at step 2.14.

Figure 3:
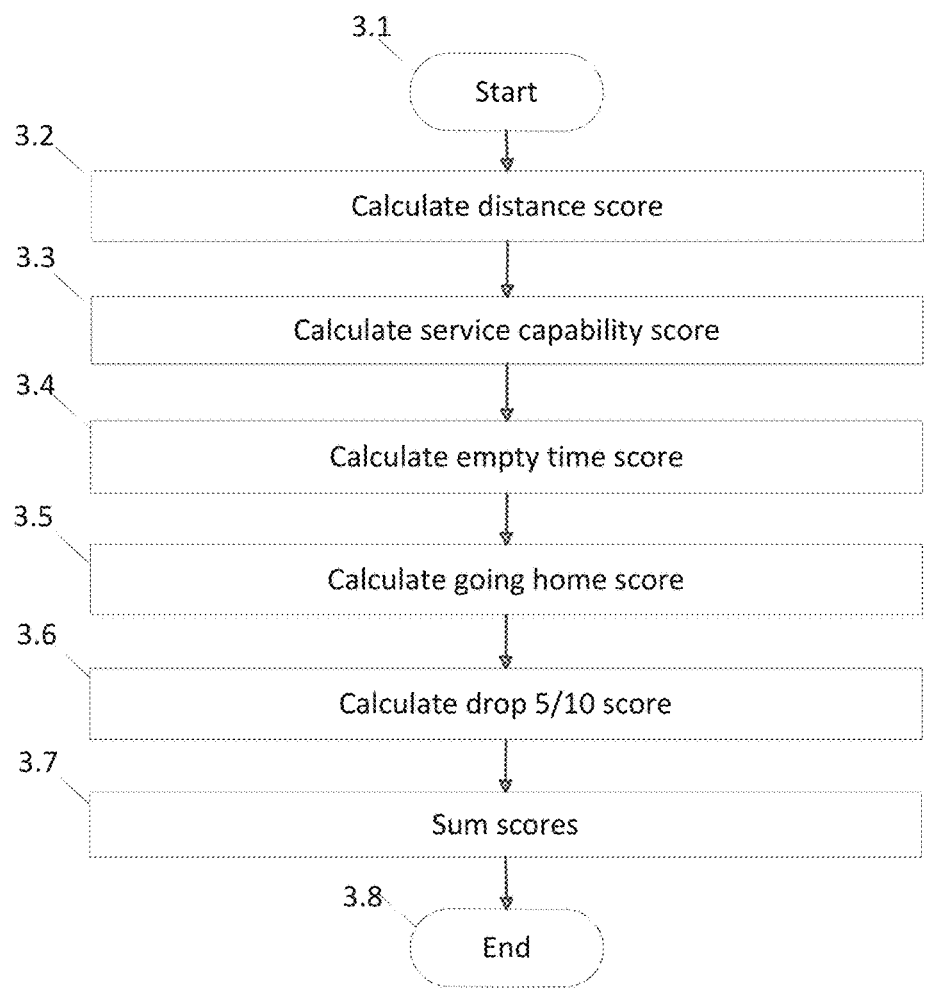
FIG. 3 is a flow chart illustrating calculating a score for a combination of a vehicle/driver pair in relation to a booking, and is performed by the system of FIG. 1a or the system of FIG. 1b.

A method of scoring a vehicle against a booking will now be described with reference to FIG. 3. The scoring process of FIG. 3 is performed by the job allocation module 105.

The operation starts at step 3.1. In brief, different scores are calculated at steps 3.2 to 3.7, and at step 3.8 the scores are summed together. Clearly, it will be appreciated that the scores may be calculated in any order, and may be calculated wholly or partly in parallel.

At step 3.2, a distance score is calculated. The distance score allows the distance between a vehicle and the pick-up location of the booking to be taken into account when scoring the vehicle against the booking. The distance score is calculated as the distance between the current position of the vehicle and the pick-up address. The distance has the unit of miles, but it may alternatively be kilometres. The distance is calculated as the distance that will need to be travelled by the vehicle to reach the pick-up address, taking into account road layout, one way streets etc. This is known as the road distance. The shortest route from the vehicle to the pick-up address is used for the distance location, even if this is not the quickest route. The route and the road distance thereof are calculated by the system 100 using information from the historical database 132. It is the last recorded position of the vehicle that is used in the distance score calculation.

An administrator or other operator of the system 100 may apply a setting such that the distance score is always zero, in which case the distance between the vehicle and the pick-up location is not taken into account in the score calculation.

At step 3.3, a service compatibility score is calculated. The service compatibility score results in the taking into account of the car type preference that was specified in the booking against the type of the vehicle that is being scored. If the type of vehicle that is being costed is the same type as that is specified in the booking, or is consistent with that type, then the service compatibility score is zero. The service compatibility score takes a positive value if there is incompatibility between the service type of the booking and the type of vehicle that is being costed. In the case of the booking specifying a VIP and the vehicle being costed being a standard vehicle, a penalty of 500 may be provided as the service compatibility score. This penalty helps to ensure that a VIP vehicle will be provided to fulfil the booking if one is available, but if not then a standard car can be provided.

In the case of the booking specifying a standard four passenger vehicle, a penalty score of 50 points is provided for a vehicle that is a seven-seater vehicle. This helps in ensuring that the booking is serviced with a suitable car, but also contributes to avoiding the removal of a large capacity vehicle from the pool of available vehicles unnecessarily.

In the case of the booking being for a standard car and the vehicle type being a VIP car, a penalty score of too is provided. Similarly to the situation described in relation to the larger capacity vehicle, this helps to ensure that the booking is satisfied whilst not removing VIP vehicles from the available fleet unnecessarily.

At step 3.4, an empty time score is calculated. The empty time score allows the utilisation of the vehicle (and corresponding driver) to be taken into account in the scoring of the vehicle in relation to the booking.

The empty time score is calculated as the product of −1 and the time (in minutes) since the last job allocated to the car/driver combination was completed and a cost per empty minute. The cost per empty minute is in effect a weighting factor. The weighting factor may be set by an administrator of the system 100. For a vehicle that is in the state POB, the empty time score is zero.

The inclusion of an empty time score in the operation of FIG. 3 helps to provide load balancing of the vehicles, and load balancing of the drivers. Vehicle load balancing helps to even out wear and tear on different vehicles in the fleet on a unit time basis. Load balancing of drivers is useful because it helps to prevent the likelihood of drivers performing too many consecutive jobs with insufficient breaks in between the jobs, and it also helps to reduce the likelihood that drivers will wait for long periods between jobs. Load balancing of drivers, through use of the empty time score in the costing operation, helps to prevent driver fatigue and thus improves safety.

At step 3.5, a going home score is calculated. If the status of the driver is 'going home', then a score is calculated. If the driver has some other state, then the going home score is zero.

If the driver's status is 'going home', the going home score is calculated as the product of −1 and the number of saved miles and a distance criteria. The saved miles component of the score provides a measure of how much closer to their home the driver would be if they fulfilled this booking. The saved miles component is calculated as the current distance to home (which is the road distance from the current location of the vehicle to the driver's home address) minus the distance between the drop off address and home (which is the road distance from the drop off location of the booking to the driver's home address). The distance criteria provides a weighting, and may be set by an administrator of the system 100.

The effect of the inclusion of the going home score is to increase the likelihood that a job will be allocated to a driver who is on the way to their home (for instance for a lunch break or having finished their shift) if the job would take the driver to a location that is nearer to their home. The magnitude of the score depends on the distance that would be saved, so a score is obtained if the drop off location is relatively closer to the driver's home address.

At step 3.6, a drop 5/10 score is calculated. For drivers that have a 'drop in 5' or a 'drop in 10' status, the drop 5/10 score has a positive value. For drivers that do not have a 'drop in 5' or a 'drop in 10' status, that is for drivers that are vacant and not allocated to a booking, the drop 5/10 score is zero. The status of the vehicle is set by the driver through their driver's device 110. In particular, when the driver's device 110 calculates that there are fewer than to minutes remaining in the journey to the drop off address, the driver's device 110 provides an option to the user to adopt the 'drop in 10' status. If the driver selects this option on the driver's device 110 (when the vehicle is stationary), the 'drop in 10' status is entered. Similarly, when the driver's device 110 detects that there are fewer than five minutes remaining in the journey to the drop off location, the driver's device 110 provides an option to allow the driver to select entering the 'drop in 5' status.

If the driver of the vehicle has a 'drop in 5' status, a score of 20 points is calculated. If the driver has the 'drop in 10' status, a score of 30 points is calculated.

The calculation of a drop 5/10 score allows vehicles that have a POB status (that is, they have a job in progress) to be considered for allocation to a booking. However, a penalty is applied to them with the result that they are less favoured than vehicles that are currently empty. This provides protection against the driver arriving late for the booking if there are unexpected delays in the previous journey.

At step 3.7, the scores calculated in steps 3.2 to 3.6 are summed, to provide a total score for the driver/vehicle/booking combination. This score is then used in an allocation process, as will now be described in reference to FIG. 4. The allocation process of FIG. 4 is performed by the job allocation module 105.

Figure 4:
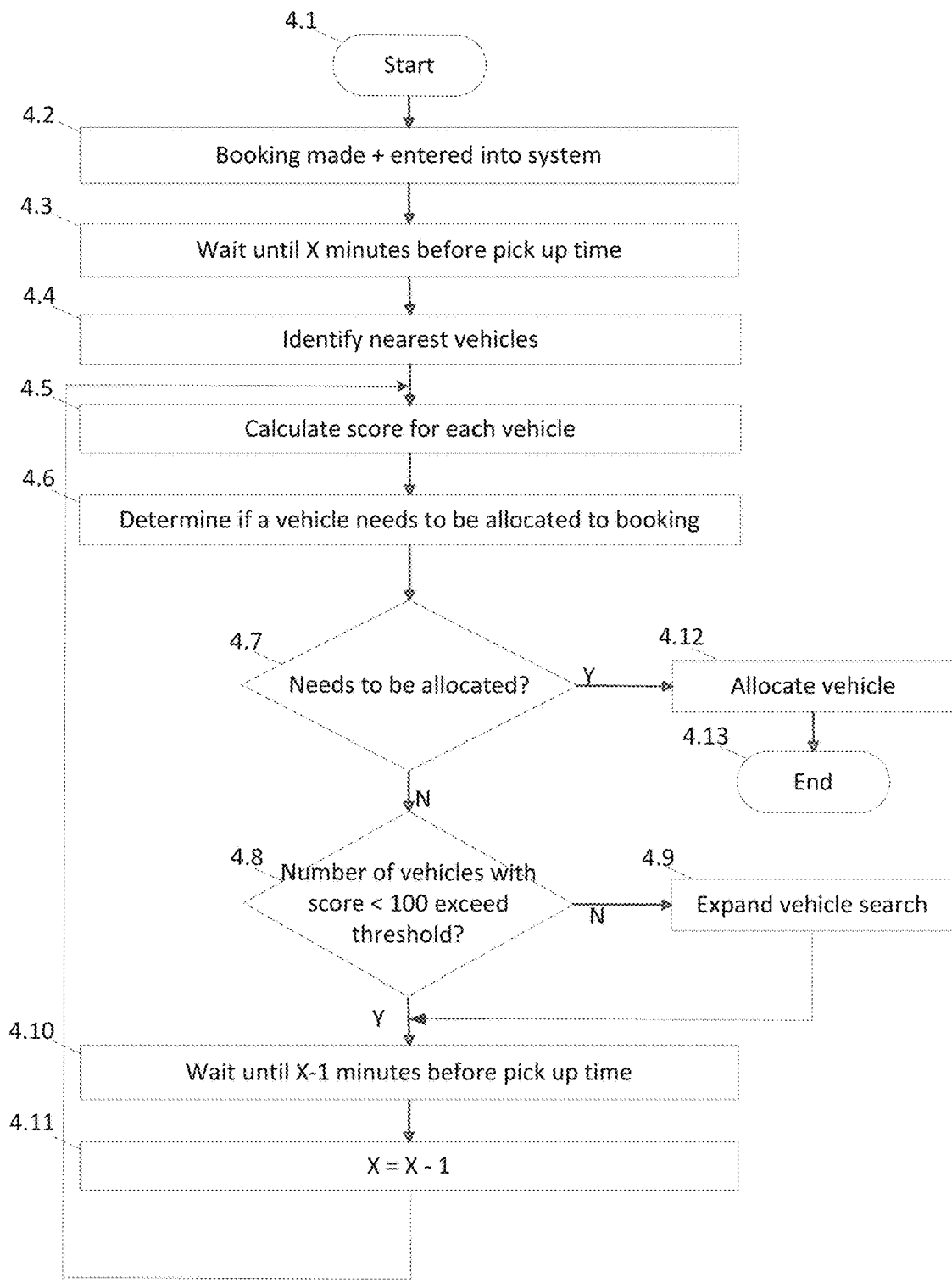
FIG. 4 is a flow chart illustrating allocation of a vehicle/driver pairing in relation to a booking, and is performed by the system of FIG. 1a or the system of FIG. 1b.

Referring to FIG. 4, the operation starts at step 4.1.

At step 4.2, a booking is made and entered onto the system. This corresponds to step 2.2 of FIG. 2.

At step 4.3, the job allocation module 105 waits until X minutes before the pick-up time for the booking. This results in the allocation process being commenced a predetermined time before the pick-up time (on the correct date). For instance, the value of X may be 20, in which case the allocation process starts 20 minutes before the scheduled pick-up time.

At step 4.4, the job allocation module 45 selects the Y vehicles that are nearest to the pick-up location of the booking. The value of Y may for instance be 20 or 30. The vehicles are determined to be nearest if they have shortest crow fly distance between their current location (which is their last reported location) and the location of the pick-up address. The distance is calculated as the straight line distance between the latitude and longitude coordinates of the location of the vehicle and the location corresponding to the pick-up address. The use of crow fly distances in step 4.4 results in an appropriate number of vehicles being selected for possible allocation to the job but without requiring the processing needed to calculate road distances and routes for each of the vehicles. In step 4.4 it is only vehicles that have the status of available, going home, drop in 5 or drop in 10 that can be selected. The result is a pool of candidate vehicles for the booking.

At step 4.5, a score is calculated for the vehicle/booking combination for each of the vehicles that were selected in step 4.4. The score is calculated as described above with reference to FIG. 3. The result is a numerical value that is an indication of the suitability of the vehicle for the booking.

At step 4.6, the job allocation module 105 determines whether a vehicle needs to be allocated to the booking. This involves determining whether there is one vehicle that is the clear best match for the booking or whether there is only one vehicle (or a small number of vehicles, e.g. 2 or 3 vehicles) that would be able to reach the pick-up location on or before the pick-up time.

There are a number of options for implementation of step 4.6, two of which will now be described.

In one alternative, a comparison is made of the scores for the vehicles as calculated in step 4.5. Because of the way the scoring is achieved, a lower numerical value indicates a greater suitability to the booking. As such, the vehicle with the lowest score is the one that is most suitable for the booking. If at step 4.6 it is determined that the vehicle with the lowest score has a score that is much lower than the second lowest score, it can be determined that the vehicle with the lowest score is sufficiently well suited to the booking that it needs to be allocated to the booking.

Alternatively, the determination that the vehicle needs to be allocated to the booking may be made if the time remaining to the pick-up time is the same as or less than a threshold amount more than the expected journey time from the lowest scoring vehicle to the pick-up address. The threshold provides a buffer. The threshold amount may be two minutes for instance. This is particularly advantageous because it results in the determination that a vehicle needs to be allocated only at the time (or perhaps shortly before the time) when the vehicle would need to leave its current location to arrive at the pick-up location in time to collect the customer on time. By making the determination in respect of the lowest scoring vehicle, it is the vehicle that is best suited to the booking that is determined to be required to be allocated to the booking even if that vehicle is not the vehicle that is closest to the pick-up location or has the shortest journey to the pick-up location.

At step 4.7, it is determined whether at step 4.6 it was determined that a vehicle needs to be allocated. If a vehicle does need to be allocated, the vehicle with the lowest score is allocated to the booking at step 4.12 before the operation ends at step 4.13.

If it is not determined that the vehicle needs to be allocated, which occurs when there is not one clear best vehicle for the booking and when there are plural vehicles that would be able to reach the pick-up location in time to meet the booking, the operation proceeds to step 4.8.

The configuration of the job allocation module 105 to allocate a vehicle to the booking at the last minute, or 'just in time', unless there is a clear best vehicle, increases the flexibility of allocation of vehicle resources of the fleet. It also contributes to reducing the overall mileage that is travelled by the vehicles of fleet in order to satisfy the bookings that are received by the system 100.

An optional step 4.8 follows step 4.7. Here, it is determined whether the number of vehicles that are reasonable candidates for allocation to the booking is sufficient. In particular, step 4.8 involves determining whether the number of vehicles with a score less than a threshold value (in this example the threshold value is 100) exceeds a threshold number of vehicles (for instance 5 vehicles). If there are insufficient vehicles, at step 4.9 the vehicles search is expanded to include further vehicles in the pool of candidate vehicles for the booking. The further vehicles are added to the vehicles that are identified at step 4.4, and the further vehicles have scores calculated for them in step 4.5 on subsequent performance of that step.

After step 4.9 or after step 4.8 revealing that there are sufficient vehicles, at step 4.10 the job allocation module 105 waits until X−1 minutes before the pick-up time. Once this time has been reached, the value of X is decremented at step 4.11 and the operation returns to step 4.5, where a new score is calculated for each vehicle in the candidate pool of vehicles. The effect of steps 4.10 and 4.11 is that scores are calculated for vehicles in the candidate pool of vehicles once every minute until a vehicle allocated to the booking.

On subsequent performance of step 4.5 in relation to a given booking, a different result may be achieved. In particular, the status and locations of the vehicles in the candidate pool of vehicles may have changed such that there now is one clear best candidate vehicle for allocation to the booking, or that the lowest scoring candidate needs to be allocated now so that they may arrive at the pick-up location in time (because the journey time from the current location of the best scoring vehicle to the pick-up location is the same as or the slightly greater than the time remaining to the pick-up time).

On subsequent execution of step 4.5, vehicles that no longer have one of the relevant statuses (available, drop in 5 or drop in 10) are removed from the candidate pool of vehicles and are not scored. As such, the size of the candidate pool of the vehicles typically reduces on subsequent executions of step 4.5. If the number of potentially suitable vehicles falls too low, this is addressed by action of steps 4.8 and 4.9, where the vehicle search is expanded and the candidate pool is added to.

It will be appreciated from the above that steps 4.5 and 4.6 are repeated until a vehicle is allocated to the booking. The number of times that the steps are repeated depends on the initial value of X, which dictates how long before the pick-up time allocation process begins, and the number of minutes before the pick-up time that the vehicle is allocated to the booking. For bookings in central city locations where there are relatively large number of vehicles, bookings may be allocated only a small number of minutes, for instance 2, 3 or 4 minutes, before pick-up times. For bookings in more remote locations, where there may be relatively few vehicles and a low vehicle density, bookings may be allocated significantly longer before the pick-up time, for instance 12, 15 or 18 minutes before the pick-up time.

For vehicle fleets with relatively low vehicle densities, having regard to the covered geographical area, a higher value of X may be appropriate. Advantageously, the value of X, which indicates the number of minutes prior to the pick-up time that the allocation process begins, may be set by an administrator of the system.

Similarly, the value of Y, which determines the number of vehicles that are identified for selection in the pool of vehicles at step 4.4 may be set by an administrator of the system 100.

Figure 1B:
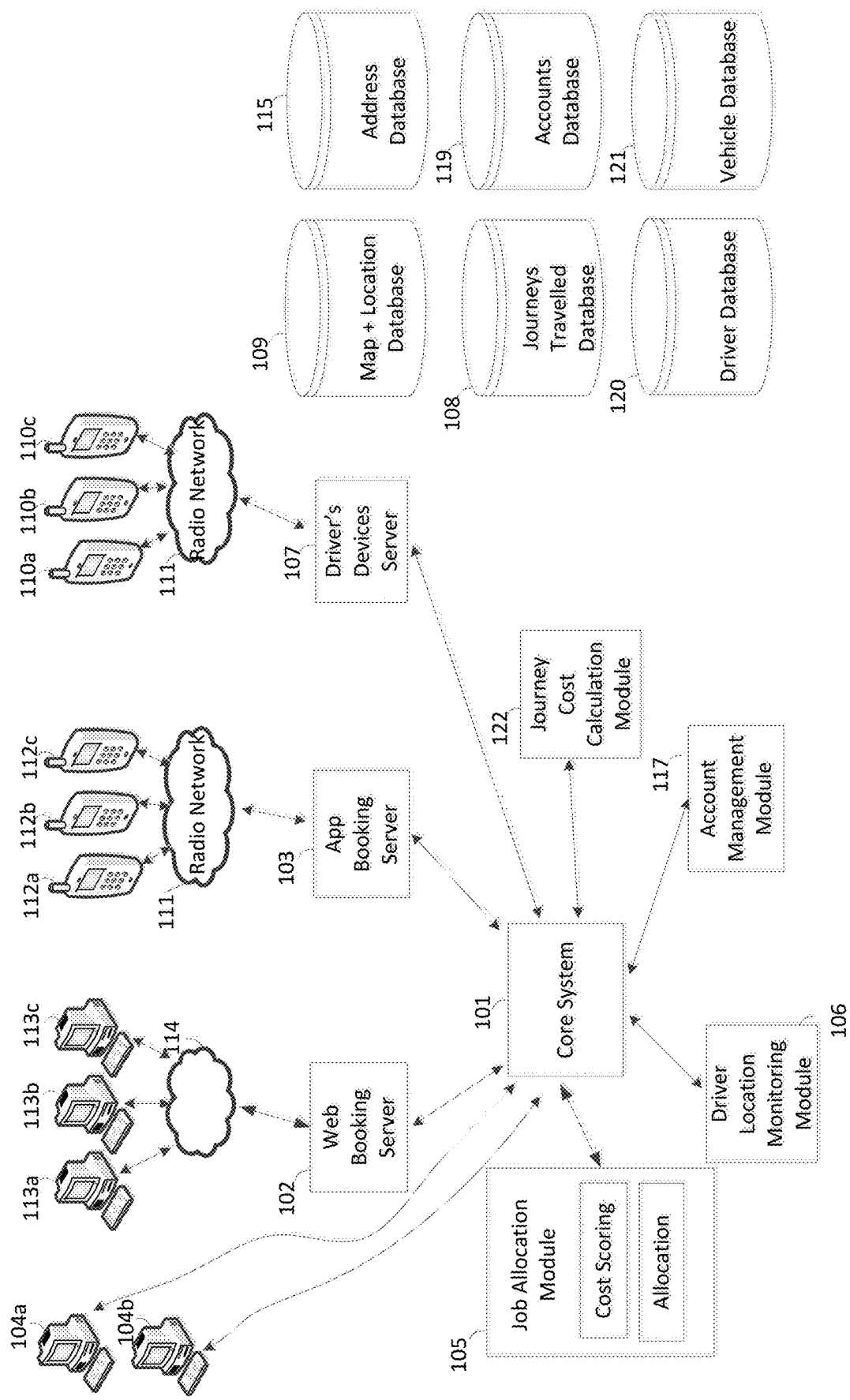
FIG. 1b is a schematic diagram of a different configuration of the FIG. 1 system for management of a private hire vehicle service according to various aspects of the present invention.

Instead of the database functions being provided by a small number of databases, in the above embodiments the operational database 130 and the driver network database 131, as well as the historical database 132, the functions may be split between a higher number of databases, as shown in the system 100 of FIG. 1*b*. Reference numerals are retained from FIG. 1*a* for like elements, and these elements are not described again here to avoid repetition.

In the FIG. 1*b* system, an accounts database 119 is configured to store the detail of every account held with the operator of the system 100. The record keeping function is provided primarily by a journeys travelled database 108 and a map and locations database 109, as well as other components of the system 100. Each vehicle has a respective record in a vehicle database 121. Each driver has a record in a driver database 120. Pick-up and drop off addresses are selected from one of the plurality of addresses stored in an address database 115. Once a job has been allocated to a particular driver and a particular vehicle, this is recorded in the journeys travelled database 108 along with an indication that the journey has not yet been travelled.

The core system 101, the web booking server 102, the application booking server 103, the job allocation module 105, the driver location monitoring module 106 and the driver's devices server 107 may be provided by a single server or by a system of cooperating servers, for instance arranged in a cluster. Each of the core system 101, the web booking server 102, the application booking server 103, the job allocation module 105, the driver location monitoring module 106 and the driver's devices server 107 includes dedicated software modules that are specific to that component. In the cases of multiple servers being used, each component may include a respective server (or more than one server) or some components may share a server or server system.

Figure 5:
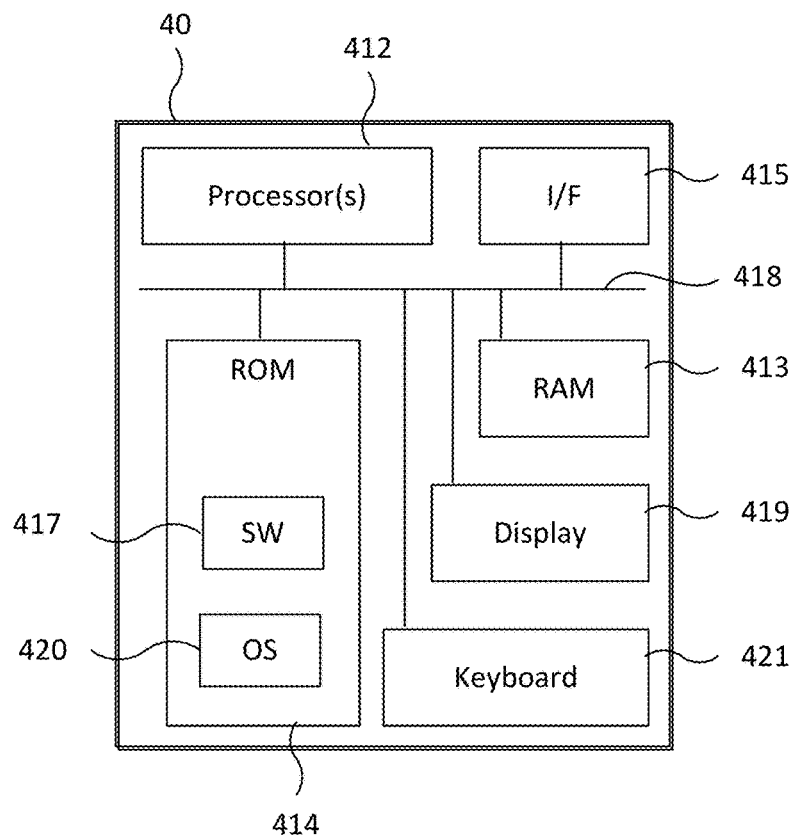
FIG. 5 is a schematic diagram illustrating components of a server forming part of the FIG. 1a or FIG. 1b system.
Figure 6:
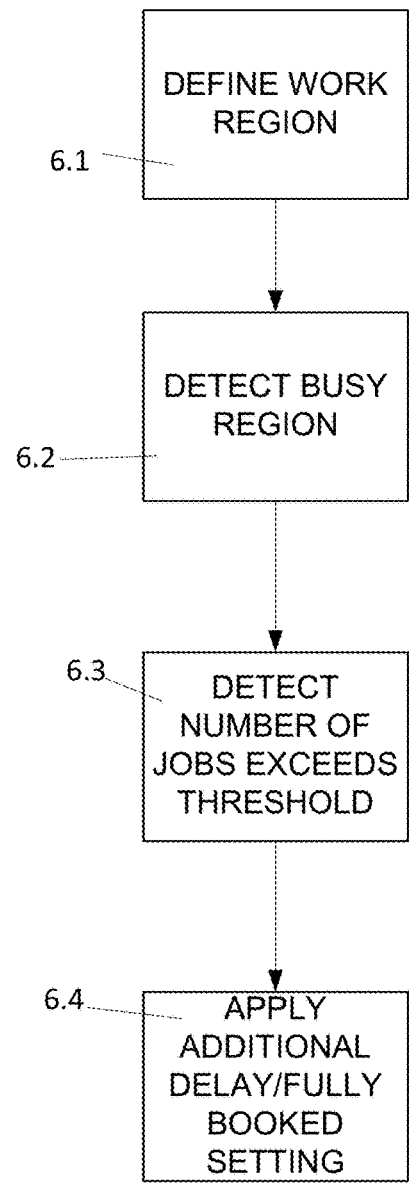
FIG. 6 is a flow chart illustrating embodiments of the invention.

Whether the system 100 includes one or multiple servers, each server includes a number of features as will now be described with reference to FIG. 5. FIG. 5 shows one server 40. If the system 100 comprises plural servers, multiple versions of the FIG. 5 server 40 are connected together.

Each server 40 in the system 100 includes a processor 412. The processor 412 is connected to volatile memory such as RAM 413 by a bus 418. The bus 418 also connects the processor 112 and the RAM 413 to non-volatile memory, such as ROM 414. A communications interface 415 is coupled to the bus 418, and thus also to the processor 412 and the memories 413, 414. The interface 415 is connected to a radio network in any suitable way, for instance via the Internet or a local network. Within the ROM 414 is stored a software application 417, which includes program code that causes the server to perform the functions required of it. An operating system (OS) 420 also is stored in the ROM 414.

An output device such as a display 419 may be provided with the server 40. An input device such as a keyboard 421 may be provided with the server 40. This allows configuration, monitoring and updating by administrators and other users as required.

The server 40 may take any suitable form. Generally speaking, the server 40 comprises processing circuitry 412, including one or more processors, and a storage device 414, 413, comprising a single memory unit or a plurality of memory units. The storage device 414, 413 stores computer program instructions that, when loaded into the processing circuitry 412, control the operation of the server 40.

In some embodiments, the vehicle resources are autonomous vehicles, also known as driverless vehicles or driverless cars. Where the system 100 comprises autonomous vehicles, each driver device 110 is replaced with an on-board control system, which can be termed an autonomous mode controller. The autonomous mode controller controls the speed and direction of the autonomous vehicle and maintains an accurate record of the unmanned vehicle's location and orientation. Autonomous driving sensors may include any number of devices configured to generate signals that help navigate the vehicle while the vehicle is operating in an autonomous (e.g., driverless) mode. The autonomous vehicle may comprise a number of cameras and other sensors, including LIDAR and/or radar sensors, which feed information about the vehicle's surroundings to the on-board operating system. The information includes the position, constitution, orientation and velocity of nearby objects, including other vehicles. The autonomous driving sensors help the vehicle "see" the roadway and the vehicle surroundings and/or negotiate various obstacles while the vehicle is operating in the autonomous mode. The on-board operating system may communicate with the core system 101 via the radio network 111 using any suitable protocol.

The autonomous mode controller may be configured to control one or more subsystems while the vehicle is operating in the autonomous mode. Examples of subsystems that may be controlled by the autonomous mode controller may include a brake subsystem, a suspension subsystem, a steering subsystem, and a powertrain subsystem. The autonomous mode controller may control any one or more of these subsystems by outputting signals to control units associated with these subsystems. The autonomous mode controller may control the subsystems based, at least in part, on signals generated by the autonomous driving sensors.

The autonomous vehicles may have on-board route planning modules as part of the autonomous mode controller. Upon the autonomous vehicle receiving information representing a start and end location for a route, the on-board route planning module accesses the map and location database 109 and optionally traffic data in the historical database 132 and/or live traffic information to calculate a best route. The autonomous vehicle may also be given information representing one or more waypoints to travel to between the start and end locations, or a number of waypoints or locations which can be travelled to in any order. The route planning module may then calculate the most efficient route to take to visit each of the locations.

Alternatively, the autonomous vehicle may not have an on-board route planning module and may instead receive route information, i.e. information specifying one or more routes, or navigation instructions from the core system 101.

As set out above, a number of bookings are received and stored by the job management module 105. For each booking, information can be stored including a service group (i.e. standard car, VIP etc), a pickup location and a pickup time. Customer details are also accessible. If the customer belongs to an account, account details can be retrieved from the accounts database 109. A priority score may also be assigned to each booking. The priority score may correspond to an account having a particular account grade to which the customer belongs.

The number of jobs within a particular region can be monitored. A region may be a postcode region such as, in London, W1A.

The job management module 105 can also maintain default delay information. A default delay (D) may be defined for each region depending on service group and work category. For example, an account booking in the W1D post code of London for a standard multi-purpose vehicle (MPV) may have a default delay of 15 minutes. A cash booking in W1F for a standard MPV may have a default delay of 20 minutes.

The default delay can be thought of as a standard delay time for a particular type of booking in a particular area. In other words, the default delay can be thought of as an average time across a job type and area for a vehicle to arrive at the pick up location at the pick-up time after it has been allocated. The default delay can vary in different areas, service groups and booking type.

The booking system 100 can also monitor a countdown time for each job. The countdown time (C) is the time between the current time and the pick up time for each booking.

A countdown to default delay ratio (C/D) for each booking may therefore be defined and expressed as a percentage value for each booking. The C/D ratio may thus provide a measure of the status of a particular booking in relation to similar bookings in the same region.

In some embodiments an unallocated booking within a region having a C/D ratio below a particular threshold may be classified as a job-no-driver (JND). In some embodiments this threshold may be set at 100%. This means that the time until the pick-up time for a particular job has dropped below the default delay for that post code area. Alternatively, the threshold may be set at any other suitable value, for example 150%. A negative C/D ratio indicates that the driver is late for the pick up.

The JND status of a booking exists until such a point as a vehicle/driver has been allocated to the booking. In some embodiments, the JND status can be removed from a booking after a predetermined time, for example 3 minutes. If the JND status criterion is still applicable then the booking is returned to a JND status. If the JND status criterion is no longer applicable then the booking keeps its 'normal' status.

The system 100 may combine several neighbouring post code areas to form a region group at step 6.1. The region group may be a flat (i.e. not hierarchical) combination of any neighbouring regions. A single region may also be included in several region groups simultaneously to give a crossover. The purpose of this is that each region group will have a variable root number for busy region detection.

Since various combinations of neighbouring post code areas are possible, region groups may be defined according to traditional traffic flow and job demand. For instance, since high volumes of work and traffic flow are experienced in the W1 region of London, it would be advantageous to define a region group consisting of post code areas W1D and W1F, where driver recovery times are generally good, and job totals are high. This allows delays to be pinpointed accurately. Alternatively sections of south west London may be more difficult to cover, and traffic flow may be poorer, so in this case a region group consisting of SW13/14/15/17/18/

19/20 may be defined. When this region group becomes busy additional delays can be introduced in all regions within the region group.

Once the number of JND in a particular region group exceeds a busy threshold, the region group is designated as a busy region group at step 6.2. The busy threshold may be set at any suitable number of JND, for example 5 JNDs.

Bookings pending inside the busy region group are given a high priority. For example, in a situation where a driver is considered for two separate allocations, the first inside the busy region group and the second outside the busy region group, the job inside the busy region group can have a driver/vehicle allocated to it regardless of distance. A region group designated a busy region group may also be designated as a dynamic hot spot so that any bookings that draw a driver/vehicle going towards that area will be assigned a preference. The vehicle allocation system allocates vehicles to bookings such that vehicles of the fleet are attracted to the hot spot organically and without requiring vehicles to be directed specifically to the hot spot. Moreover, this is achieved automatically. The vehicle allocation system in embodiments using hot spots allocates bookings based on scores calculated for each vehicle and downscores (during the scoring process shown in FIG. 3) vehicles for bookings that do not start within the hot spot if the vehicle is within a certain range of the hot spot so that these vehicles are less likely to be allocated. This results in an increased relative likelihood that vehicles that are not close to the hot spot will be allocated to the booking, allowing vehicles that are close to the hot spot to remain available for allocation to bookings that do start within the hot spot.

One or more rules may be applied for each busy region group. In broad terms, once a number of JND in a busy region group exceeds a certain threshold value at step 6.3, additional delays or a fully booked status may be added to bookings within that busy region group, at step 6.4.

In some embodiments, this threshold is the number of JND in a region group, for example 6 JNDs. Therefore, if the number of JNDs exceeds this JND threshold an additional delay can be added to the default delay.

Alternatively, the additional delay may be introduced if the number of JNDs exceeds a multiple of the busy region threshold. For example, an additional delay may be introduced if the number of JND in a region group is twice as high as the busy threshold for that region group. In the example above, where the busy threshold is 5 JNDs, an additional delay may be applied to the region group if the number of JNDs is 10 more. Alternatively, other multiples of the busy region threshold may be used. Additional delays may be applied when the number of JNDs in the region group exceeds 3, 4 or 5 times the busy region threshold.

In other embodiments, a dynamic reference value can be set which is used to trigger the addition of additional delays or a fully booked setting. This reference value can be thought of as a JND per unit reference value. This dynamic reference value is defined as the ratio of the total number of vehicles in a particular service group (SG) that are online and an input number.

The total number of vehicles in a particular service group (SG) that are online can be the number of drivers that have logged into the allocation application. This figure provides an indication of the number of vehicles that are currently available in the service group.

The input number is the denominator in the ratio. The input number can be selected and inputted by a system administrator at a user interface having regard for current traffic conditions in the busy region group.

For example, if there are 1281 multi-purpose vehicles (MPV) online, an input number of 425 MPVs may be inputted, giving a reference value of 3 for the MPV service group. This JND per unit reference value is a dynamic variable and is dependent on the number of vehicles online and on the denominator value inputted by a user having regard to the current traffic conditions. Separate reference values may be defined in a similar way for other service groups such as VIP vehicles.

Various rules can be defined for use with the reference values. For example, if the number of JNDs in a region group exceeds a predefined multiple of the JND per unit reference value, an additional delay may be introduced to bookings inside the region group. For example, a rule may state that an additional delay is to be added if there are twice as many JNDs in a region group compared with the JND per unit reference value. If, for example, the JND per unit reference value is 3 and the number of JNDs inside the region group is 6, an additional delay may be applied. This application of additional delays is automated.

As such, a system administrator can select at what point the rule is triggered by varying the input number which in turn varies the JND per unit reference value. If the rule requires, as above, that an additional delay is introduced when there are twice as many JNDs in a region group compared with the JND per unit reference value, then the user can influence at what point the additional delay is introduced. The advantage of this configuration is that an automatic system can be provided for introducing additional delays which can still be influenced by the system administrator.

The JND per unit reference value can also act as the busy region threshold. In this example, if the number of JNDs in the region group exceeds 3, the region group is designated as busy.

As above, rules may be defined with various other multiples of the JND per unit reference value to trigger the introduction of an additional delay.

A further condition for adding an additional delay can be provided which is linked to the C/D ratio. Let us suppose a certain number of jobs are within their respective standard delay window. If the number of bookings having a C/D ratio below a certain percentage (e.g. 40%) rises above a threshold, an additional delay may be added. This condition is advantageous since it provides for the introduction of additional delays to bookings based on time remaining as well as the above conditions which rely on the volume of work.

Linking the introduction of an additional delay to the countdown time is advantageous. Often when traffic flow is poor, there is bad weather or road works for instance; jobs can be observed to 'stick' since delays are encountered between the allocation and the pick up. In these situations, JND volumes cannot be relied on solely for applying any required additional delays. By monitoring the countdown time on work in the busy region group, additional delays may be put in place once a proportion of jobs having a C/D ratio below 40% for example, is above a threshold.

As will be understood, the C/D ratio declines when there are few or no drivers available for allocation. The rules relating to the C/D ratio also reflect the ability of the busy region to recover from heavy traffic periods since once the proportion of jobs having a C/D ratio below a certain percentage falls below the threshold the rule is no longer in force and the additional delays are no longer included.

For a particular Region Group (RG), certain rules can be defined. A threshold may be defined beyond which an added delay is added. This threshold may be chosen as e.g. 2, 3 or 4 times the busy threshold or JND per unit reference value. As stated above, an additional delay is added when there are twice as many JND compared with the reference value.

The additional delay that is applied for a particular service group, booking type and region group can be added to journey times for vehicles that are considered for allocation to subsequent jobs. A journey time for a vehicle which is a candidate for allocation is the estimated journey time for that vehicle to arrive at the pick up location. By including an additional delay time to the journey time during the allocation process, real time traffic conditions can be taken into account automatically.

The additional delay may be communicated to the waiting customer by SMS as a late time. Also, subsequent bookings can be alerted to the additional delay. In particular, the additional delay may be added to the estimated time of arrival of a vehicle that is has been allocated to an ASAP booking. In alternative embodiments, additional delays and/or any issues surrounding vehicle availability may be provided to the customer at the booking stage.

If a full threshold is reached, a fully booked setting may be applied to future bookings inside the region group. The full threshold is normally set higher than an additional delay threshold. The fully booked setting may be applied selectively. For example, the fully booked setting may be applied only to cash bookings. Alternatively, the fully booked setting may be applied to bookings having a priority rating below a certain threshold. If a customer subsequently attempts to make a booking that falls within the fully booked condition, a notification may be sent to them in any suitable way.

An offset may be applied to additional delays and fully booked settings whereby all additional delays and/or fully booked settings are removed after a predetermined offset time after the region group has ceased to be designated 'busy'.

As will be understood, a particular condition or busy status may cease to be in effect if the number of JND drops below a certain threshold or if the number of jobs having a low C/D ratio falls below a certain threshold.

As set out above, several rules may be established for a particular region group. An example will now be described.

EXAMPLE

Figure 7:
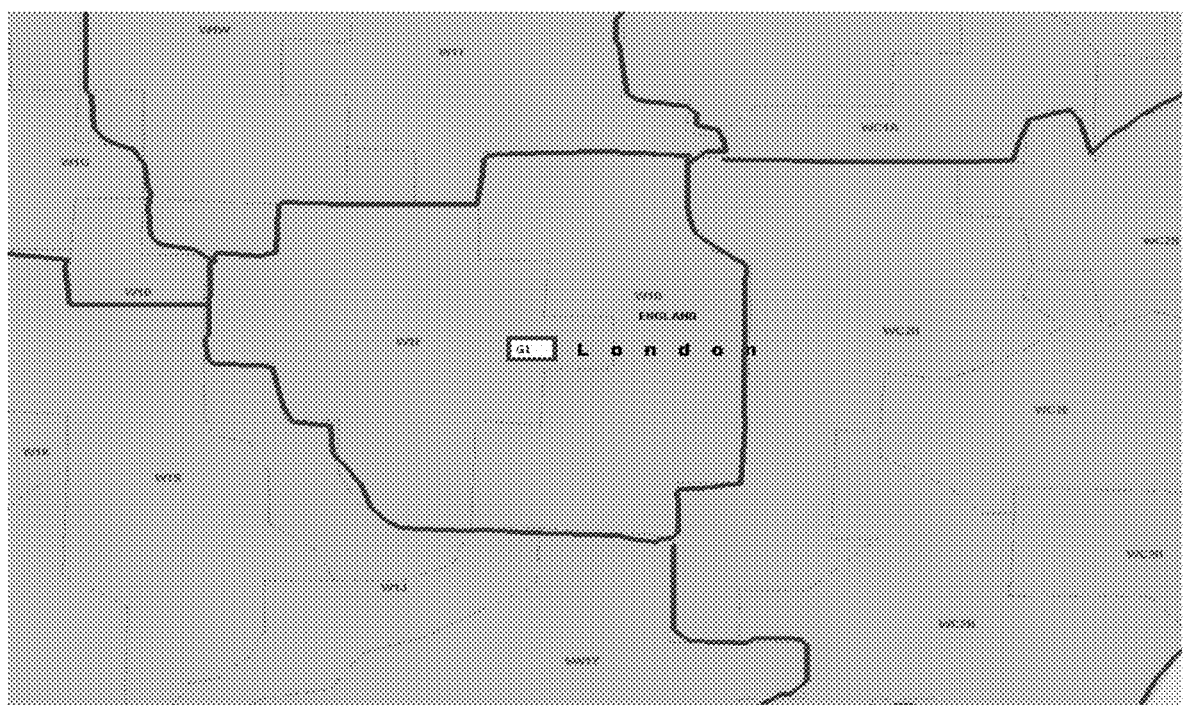
FIG. 7 shows a work region.

A region group (RG) is defined as G1, as shown in FIG. 7. G1 comprises the post code areas W1D and W1F. In this discussion the following rules apply to the standard cars service group. A default delay of 10 minutes applies to cash bookings and a 5 minute default delay applies to account bookings.

A busy threshold of 6 applies to G1 so that once there are 6 or more JNDs, G1 is designated a busy region. This threshold may be either a fixed number or JND per unit value.

The following conditions may be defined for G1:
1) If the number of JNDs exceeds twice the busy threshold, the default delay is doubled.
2) If there are 4 or more jobs having a C/D ratio below 40% then the default delay is doubled.
3) If the number of JNDs exceeds three times the busy threshold, a fully booked setting is applied.
4) If there are 5 jobs in G1 having a C/D ratio below 20% then a fully booked setting is applied.
5) A fully booked setting may only be applied to bookings having a priority setting below 5.
6) All additional delays or fully booked settings have a 10 minute offset. In other words, the additional delays or fully booked settings cease to apply 10 minutes after G1 is no longer classed as a busy region group.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Reference to "computer-readable storage medium", "computer program product", "tangibly embodied computer program" etc., or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

It should be realised that the foregoing embodiments are not to be construed as limiting and that other variations and modifications will be evident to those skilled in the art and are intended to be encompassed by the claims unless expressly excluded by the claim language when taking into account equivalents. Some such alternatives and modifications will now be described.

In the above, journey cost calculation is performed at the time of a booking and the result returned to the customer requesting the booking. Cost calculation may alternatively be performed ahead of the booking being made (for instance on the basis of an agreed tariff), at the end of fulfilment of the booking, or at a later time.

Additionally, the cost scoring of a vehicle against a booking may be performed in any suitable way. Also, cost scoring may be performed only once and the best vehicle allocated at that time, rather than cost scoring being performed until it is decided to allocate a vehicle.

Moreover, the disclosure of the present application should be understood to include any novel features or any novel combination of features either explicitly or implicitly disclosed herein or in any generalisation thereof and during prosecution of the present application or of any application derived therefrom, new claims may be formulated to cover any such features and/or combination of such features.

The invention claimed is:
1. A method of directing a plurality of networked vehicle resources by a processing system, the method comprising:
provinding the plurality of networked vehicle resources in a plurality of geographical areas, wherein the plurality of networked vehicle resources includes autonomous vehicles;
receiving location information for each of the plurality of networked vehicle resources through a network connection by a communication interface of the processing system;
defining at least one geographical area of said plurality of geographical areas as a work region;
storing, in a data structure, the location information and data relating to vehicle hire bookings beginning inside the work region, wherein booking information for each booking includes a default delay time which is an average time before a selected networked vehicle resource is provided at a specified location within said work region;

applying a rule to determine that an additional delay condition is satisfied within the work region by determining whether a number of bookings meeting a criterion exceeds a threshold for introducing an additional delay, wherein the criterion is that a ratio of a pickup countdown time to the default delay time is below a predetermined value;

in response to positively determining, automatically adding the additional delay, respectively, to the default delay time of at least some of the vehicle hire bookings inside the work region; and directing the networked vehicle resources to the at least some of the vehicle hire bookings with reference to the additional delay.

2. The method of claim 1, further comprising:
comparing a number of unallocated bookings beginning inside the work region that are due for allocation to a stored busy threshold; and
designating the work region as a busy work region if the number of unallocated bookings exceeds the stored busy threshold.

3. The method of claim 2, further comprising designating the busy work region as a hot spot region.

4. The method of claim 2, wherein the stored busy threshold is defined as a ratio of a number of currently active vehicles to a user inputted number.

5. The method of claim 1, wherein determining that an additional delay rule is satisfied comprises determining that a number of unallocated bookings that are due for allocation exceeds a threshold for introducing an additional delay.

6. The method of claim 2, wherein the threshold for introducing an additional delay is a preset multiple of the stored busy threshold.

7. The method of claim 1, wherein the additional delay for a booking comprises a multiple of the default delay time for the booking.

8. The method of claim 1, wherein the additional delay comprises a predetermined time period.

9. The method of claim 1, further comprising transmitting a message to a customer making a subsequent booking beginning inside the work region of the additional delay.

10. The method of claim 1, wherein a magnitude of the additional delay applied to a booking is dependent on a service group and/or a booking type.

11. The method of claim 1, further comprising removing any additional delay after a predetermined offset time has elapsed.

12. The method of claim 1, wherein defining a geographical area as a work region comprises forming a region group consisting of a plurality of geographical regions.

13. The method of claim 1, wherein the plurality of networked vehicle resources comprises one or more autonomous vehicles.

14. A non-transitory tangible computer-readable storage medium having stored thereon computer-readable code, which, when executed by a computing apparatus, causes the computing apparatus to direct a plurality of networked vehicle resources that includes autonomous vehicles in a plurality of geographical areas, the directing comprising:

receiving location information for each of the plurality of networked vehicle resources through a network connection by a communication interface of the computing apparatus;

defining at least one geographical area of said plurality of geographical areas as a work region;

storing, in a data structure, the location information and data relating to vehicle hire bookings beginning inside the work region, wherein booking information for each booking includes a default delay time which is an average time before a selected networked vehicle resource is provided at a specified location within said work region;

applying a rule to determine that an additional delay condition is satisfied within the work region by determining whether a number of bookings meeting a criterion exceeds a threshold for introducing an additional delay, wherein the criterion is that a ratio of a pickup countdown time to the default delay time is below a predetermined value;

in response to positively determining, automatically adding the additional delay, respectively, to the default delay time of at least some of the vehicle hire bookings inside the work region; and directing the networked vehicle resources to the at least some of the vehicle hire bookings with reference to the additional delay.

15. A system configured to direct a plurality of networked vehicle resources that includes autonomous vehicles provided in a plurality of geographical areas wherein the autonomous vehicles provide their location information to the system, the system comprising:

a network interface configured to receive the location information for each of the plurality of the networked vehicle resources;

at least one processor and at least one memory having computer-readable code stored thereon which when executed controls the at least one processor to manage a plurality of networked vehicle resources by performing:

defining at least one geographical area of said plurality of geographical areas as a work region;

storing, in a data structure, the location information and data relating to vehicle hire bookings beginning inside the work region, wherein booking information for each booking includes a default delay time which is an average time before a selected networked vehicle resource is provided at a specified location within said work region;

applying a rule to determine that an additional delay condition is satisfied within the work region by determining whether a number of bookings meeting a criterion exceeds a threshold for introducing an additional delay, wherein the criterion is that a ratio of a pickup countdown time to the default delay time is below a predetermined value;

in response to positively determining, automatically adding the additional delay, respectively, to the default delay time of at least some of the vehicle hire bookings inside the work region; and directing the networked vehicle resources to the at least some of the vehicle hire bookings with reference to the additional delay.

16. The method of claim 1, further comprising:
receiving at least some of the vehicle hire bookings through an app booking server before storing said vehicle hire bookings in said data structure, wherein the app booking server receives the at least some of the vehicle hire bookings from a radio network.

17. The method of claim 1, wherein the directing the networked vehicle resources includes:

selecting one networked vehicle resource of the plurality of networked vehicle resources for one vehicle hire booking of the at least some of the vehicle hire bookings;

storing a record of the selecting in the data structure; and electronically transmitting a message to the one networked vehicle resource, the message including a pick-up location and a drop-off location.

18. The method of claim 17, further comprising:

electronically transmitting a message to a source of the one vehicle hire booking, the message including attributes of the one networked vehicle resource.

19. The non-transitory tangible computer-readable storage medium according to claim 14, wherein the directing further includes receiving at least some of the vehicle hire bookings through an app booking server before storing said vehicle hire bookings in said data structure, the app booking server receiving the at least some of the vehicle hire bookings from a radio network, and the directing the networked vehicle resources includes selecting one networked vehicle resource of the plurality of networked vehicle resources for one vehicle hire booking of the at least some of the vehicle hire bookings, storing a record of the selecting in the data structure, and electronically transmitting a message to the one networked vehicle resource, the message including a pick-up location and a drop-off location.

20. The system according to claim 15, further comprising:

an app booking server configured to receive electronic data from a radio network and to receive at least some of the vehicle hire bookings through the radio network before storing said vehicle hire bookings in said data structure; and a driver's devices server configured to transmit electronic data to the radio network and to transmit a message to a selected one of the networked vehicle resources, the message including a pick-up location and a drop-off location.

* * * * *